United States Patent [19]

Bose et al.

[11] Patent Number: 4,999,330
[45] Date of Patent: Mar. 12, 1991

[54] HIGH-DENSITY ADSORBENT AND METHOD OF PRODUCING SAME

[75] Inventors: Tapan K. Bose; Richard Chahine; Jean-Marie St-Arnaud, all of Trois-Riviéres, Canada

[73] Assignees: Universite du Quebec a Trois-Rivieres, Trois-Rivieres; Societe Quebecoise d'Initiatives Petrolieres, Sainte-Foy; Gas Metropolitain Inc., Montreal, all of Canada

[21] Appl. No.: 312,940

[22] Filed: Feb. 21, 1989

Related U.S. Application Data

[63] Continuation-in-part of Ser. No. 171,744, Mar. 22, 1988, abandoned.

[51] Int. Cl.$^5$ .................... B01J 20/26; B01J 20/20; F17C 11/00; C01B 31/00
[52] U.S. Cl. .................................. 502/402; 55/74; 206/0.7; 264/29.5; 264/109; 502/404; 502/416; 502/417; 502/526
[58] Field of Search ............... 502/402, 416, 417, 404, 502/526, 159; 206/0.7; 264/29.5, 109

[56] References Cited

U.S. PATENT DOCUMENTS

| | | | |
|---|---|---|---|
| 1,175,607 | 3/1916 | Coleman | 502/526 |
| 4,405,378 | 9/1983 | Kulprathipanja | 502/404 |
| 4,528,281 | 7/1985 | Sutt, Jr. | 502/402 |
| 4,629,476 | 12/1986 | Sutt, Jr. | 55/74 |
| 4,665,050 | 5/1987 | Degen et al. | 502/159 |

Primary Examiner—Paul E. Konopka
Attorney, Agent, or Firm—Foley & Lardner

[57] ABSTRACT

The invention is concerned with a high-density adsorbent comprising a compacted mass of high surface area carbon particles bound together with a binder and defining a network of substantially unobstructed micropores, the mass of carbon particles having been compacted under a pressure sufficient to cause a reduction of about 50 to about 200% in bulk volume of the mass and a corresponding increase of about 50 to about 200% in density, thereby providing a gas storage capacity increase of about 20 to about 100% over that of the high surface area carbon particles in loose or uncompacted form. The high-density adsorbent according to the invention is particularly useful in adsorption storage systems for low-pressure storage of compressed natural gas.

23 Claims, No Drawings

HIGH-DENSITY ADSORBENT AND METHOD OF PRODUCING SAME

This application is a Continuation-in-Part of application Serial No. 171,744, filed on Mar. 22, 1988, now abandoned.

The present invention relates to a high-density adsorptive material and to a method of producing high-density carbon adsorbents which can be used in adsorption storage systems for low-pressure storage of compressed natural gas.

In storage systems based on adsorption, the amount of gas stored in a high-pressure cylinder is enhanced by placing a substrate with a high surface area in the cylinder. When the cylinder is pressurized with a gas, a large portion of the gas adsorbs on the substrate, thus lowering the storage pressure.

Physical adsorption of a gas by a solid takes place when the concentration of the gas molecules at the gas/solid interface is greater than the bulk concentration. This enrichment is caused by the Van der Walls interactions at the gas/solid interface. The nature of the solid plays an important role in adsorption phenomena and certain sites in the solid surface are more favorable to adsorption than others.

For a given mass of solid, adsorption is proportional to the surface area of the solid. Maximization of the surface area of a given solid may be realized either by breaking up the solid into fine particules or, more realistically, by producing an extensive network of fine pores in the solid. The surface area and hence the adsorption properties of a porous solid depend on the size of its pores. The pore sizes classified as micro-pores ($<2$ nm) are mostly responsible for pore filling adsorption. The bigger pore sizes such as mesopores (between 2 and 50 nm) and macropores ($>50$ nm) are responsible for monolayer/multilayer adsorption and capillary condensation.

Since in adsorption storage systems for automotive use, the adsorption of natural gas whose main constituent is methane takes place at ambient temperatures, some 100° C. greater than the critical temperature of methane, there will be no possibility of capillary condensation in the adsorbent pores regardless of the pressure used. Consequently, for methane adsorption, adsorbents with large micropore volumes are generally more effective than adsorbents with large macropore volumes.

Studies carried out to date have indicated that high surface area carbons in general are better adsorbents for natural gas than zeolite type materials. High surface area carbons can be prepared in a variety of ways, for example, by pyrolysis, by catalytic oxidation and by leaching; the method used depends upon the nature of the starting material and the particular physical and morphological characteristics desired in the final product.

Packing density of adsorbents, which may be defined as the mass of settled material per unit volume of storage space, has also been shown to be a critical parameter associated with the adsorption storage of natural gas. A carbon with a mediocre surface area but a high packing density may actually store more methane, when loaded into a cylinder, than a high surface area carbon with a low packing density. Although the packing density of a carbon substrate can be changed to a limited extent by altering the size and shape of the final product, the greatest impact upon packing density occurs during the actual formation process. Both the leaching and catalytic oxidation processes increase surface area at the expense of packing density.

Most carbons are supplied having uniform mesh size but irregularly shaped granules. When these are packed into a storage tank, there is generally a large and undesirable void volume and often a substantial macropore volume both of which can be considered to be the same for methane adsorption at ambient temperatures. Studies on packing efficiency of various carbons show that typically more than 60% of the packing space is, in effect, no different from an empty tank. The space utilization efficiency is thus low.

Moreover, in vehicular gaseous fuel storage applications, the carbon adsorbents should be hard, not easily broken or powdered. The daily jostling and vibration which an adsorption storage system in a natural gas fueled vehicle would encounter in routine operation would, over a period of time, reduce a soft carbon to a fine powder that could easily fluidize and clog the fuel system or enter into the combustion chamber. Unfortunately, some of the best carbon adsorbents are either soft or in powder form and as such cannot be easily handled or used in vehicular applications.

It is therefore an object of the present invention to minimize void volume in adsorption storage vessels and to thus provide a high-density adsorbent having a substantially reduced bulk volume but still exhibiting substantial adsorptivity.

It is a further object of the invention to provide a high-density adsorbent which is sufficiently hard to withstand powdering when subjected to vibration in vehicular gaseous fuel storage applications.

According to one aspect of the invention, there is provided high-density adsorbent comprising a compacted mass of high surface area carbon particles bound together with a binder and defining a network of substantially unobstructed micropores, the mass of carbon particles having been compacted under a pressure sufficient to cause a reduction of about 50 to about 200% in bulk volume of the mass and a corresponding increase of about 50 to about 200% in density, thereby providing a gas storage capacity increase of about 20 to about 100% over that of the high surface area carbon particles in loose or uncompacted form.

The present invention also provides, in another aspect thereof, a method of producing a high-density adsorbent as defined above. The method according to the invention comprises mixing high surface area carbon particles with a solution of a binder in a solvent to form a slurry and thereby wet each particle of carbon with the solution of binder. The solvent is then removed from the slurry to obtain particles of carbon coated with a film of the binder, and the binder-coated particles of carbon are compacted under pressure to provide a compacted mass of high surface area carbon particles bound together and defining a network of substantially unobstructed micropores, the pressure being sufficient to cause a reduction of about 50 to about 200% in bulk volume of the mass and a corresponding increase of about 50 to about 200% in density, thereby obtaining an adsorbent exhibiting a gas storage capacity increase of about 20 to about 100% over that of the high surface area carbon particles in loose or uncompacted form.

Applicant has found quite unexpectedly that by pressing together high surface area carbon particles coated with a film of binder, high-density adsorbents of reduced bulk volume could be obtained without substantially lowering their adsorptivity.

According to a preferred embodiment, use is made of a thermoplastic binder. The use of a thermoplastic binder for binding together the carbon particles has been found to significantly contribute to the hardness of the resulting product. The adsorbent obtained is thus hard and does not powder when subjected to vibration.

Experimental results have shown that the larger the amount of binder used the greater is the hardness of the adsorbent obtained, however, to the detriment of the specific adsorption of the adsorbent which is correspondingly reduced. Therefore, the binder should be used in an amount sufficient to provide an adsorbent of adequate hardness without substantially altering the specific adsorption thereof. Preferably, the binder is used in an amount of about 1 to about 10% by weight, based on the total weight of the adsorbent composition.

A particularly preferred thermoplastic polymer for use as binder in accordance with the invention is polyvinyl alcohol which not only has excellent binding properties but also is soluble in water and is chemically resistant to organic solvent, oils and greases. The polyvinyl alcohol preferably used has a molecular weight of about 125,000 and a melting point of about 200° C. It can be used in amount ranging from about 1 to about 5% by weight, based on the total weight of the adsorbent composition, to provide adsorbents of the desired hardness and adsorptivity, the preferred proportion of polyvinyl alcohol being about 2% by weight.

It is also possible to use other binders such as, for example, cellulose derivatives. A particularly preferred cellulose derivative is methylcellulose having a viscosity of about 4,000 centipoises, calculated as a 2% solution in water.

The high surface area carbon particles, on the other hand, preferably comprise activated carbon such as the carbon available under the trade mark AX-21. Prior to being mixed with the solution of binder, the carbon particles are preferably wetted with the solvent so as to fill the pores in the particles with solvent and thereby prevent the binder from entering the pores. Should some of the pores become clogged with binder, these can be opened by subjecting the final product to a post heat treatment so as to cause evaporation of the solvent from within the pores and thus opening of the pores.

When preparing the slurry of carbon particles dispersed in the solution of binder, conventional additives such as plasticizers and internal lubricants can be added to improve the general characteristic of the final product. For example, polyethylene glycol can be added as a plasticizer, in an amount generally ranging from about 1 to about 2% by weight to facilitate processing and to increase the flexibility and toughness of the final product. Glycerine can also be added as a lubricant and can be used in an amount of about 2 to about 6% by weight.

Removal of the solvent from the slurry is advantageously effected by heating the slurry under agitation to cause evaporation of the solvent, or by spray drying. The spray drying technique is well known in the art and essentially consists in atomizing the slurry into fine droplets which are almost instantly dried.

The binder coated carbon particles are thereafter compacted to any desired geometric shape, for example by compression molding. Where it is desired to form disk-shaped tablets, for instance, the particles can be placed in a high-pressure cylindrical dye and compressed by means of a hydraulic press at pressures which may range from about 140 to about 600 MPa, i.e. about 20,000 to about 85,000 psi. Depending upon the type of high surface area carbon used, binding of the particles together can be enhanced by heating the compacted particles at a temperature and over a period of time such as to cause uniform melting of the binder throughout the shaped product, while maintaining the compaction pressure. This is generally effected by heating at or slightly above the melting temperature of the thermoplastic binder. For example, in the case of AX-21 carbon particles coated with polyvinyl alcohol, exceptional results were obtained by slowly heating such particles once compacted to about 220° C. and maintaining the particles at such a temperature while also maintaining the compaction pressure for a period of about 2 hours. Care should be taken to heat the particles at a slow heating rate, for example 3-4° C./min., to avoid temperature gradients in the shaped product and thus prevent surface cracking. Care should also be exercised when withdrawing the disk-shaped tablets from the high-pressure dye so as to prevent the tablets from being subjected to undue mechanical stresses. For example, shear can be minimized by subjecting one of the press ram of the dye to a retention force with a compression spring while the other press ram is slid inside the dye against the forcably retained ram with the tablet therebetween to remove the latter from the dye.

As previously mentioned, in order to open any clogged pores of the adsorbent thus obtained, which may have been clogged with binder during processing, and also to remove any minute quantities of solvent which the adsorbent may still retain, it has been found advantageous to subject the resulting adsorbent to a heat treatment at a temperature above the melting temperature of the binder to cause partial pyrolysis of the binder as well as evaporation of any remaining solvent. For example, in the case of polyvinyl alcohol binded particles, the adsorbent can be heated under vacuum at a temperature of about 300° C. Such as a post heat treatment has been found to increase the specific adsorption of the adsorbent. However, when heated at a temperature above the melting temperature of the binder, the adsorbent tends to swell and to thus increase in volume, thereby lowering its density and reducing the binding force between particles. In order to prevent the adsorbent from swelling during the post heat treatment, the adsorbent is advantageously heated while being held under confinement, for example by placing the adsorbent when in the form of disk-shaped tablets in a cylinder having the same diameter as the tablet.

The high-density adsorbents according to the invention are particularly useful for adsorbing gaseous hydrocarbon fuels such as methane, and can thus be used in adsorption storage systems for low-pressure storage of compressed natural gas. High-density adsorbents produced in accordance with the invention have been found capable of storing up to 5 times more gas in a cylinder filled with the adsorbent under a storage pressure of 3.45 MPa at 25° C., than in the same cylinder with no adsorbent. Such a storage capacity by adsorption is equivalent to that obtained by compression storage at 15.5 MPa.

The following non-limiting examples further illustrate the invention.

EXAMPLE 1

High-density adsorbents in the form of disk-shaped tablets having 25 mm in diameter and 5-10 mm in thickness were produced by first mixing one part of activated carbon AX-21 with four parts of water to wet the carbon particles. In a separate container, polyvinyl alcohol was dissolved in water and the aqueous solution of polyvinyl alcohol was admixed to the aqueous dispersion of carbon particles to form a slurry and thus wet the carbon particles with the solution of polyvinyl alcohol. Polyethylene glycol and glycerine were also admixed in the form of aqueous solutions.

The water was then evaporated from the slurry by heating under agitation, thereby obtaining carbon particles coated with a film of polyvinyl alcohol. These were thereafter formed into disk-shaped tablets by pressure-molding, the compacted particles being slowly heated to about 220° C. and maintained at such a temperature for about 2 hours, while maintaining the compaction pressure.

The adsorbent thus obtained was thereafter heat treated at about 300° C. under vacuum to open any clogged pores and to evaporate minute quantities of water which the adsorbent may still retain.

The specific adsorption of the resulting adsorbent for methane at various pressures was determined as a function of the amount of polyvinyl alcohol (PVA) used during processing. The results are reported in the following Table:

TABLE A

| % PVA | Specific Adsorption (g $CH_4$/100 g adsorbent) at 25° C. | | | |
|---|---|---|---|---|
| | 2.4 MPa | 3.45 MPa | 5.17 MPa | 6.9 MPa |
| 2 | 13.15 | 14.78 | 16.52 | 17.49 |
| 3 | 12.01 | 13.56 | 14.92 | 15.48 |
| 4 | 10.75 | 12.24 | 13.74 | 14.75 |
| 5 | 11.06 | 12.41 | 13.45 | 13.87 |

As can be seen from the above, there is a reduction in the specific adsorption of the adsorbent as the proportion of polyvinyl alcohol increases.

The storage capacity of the adsorbent as well as its mean density were also determined as a function of the amount of polyvinyl alcohol used. The results are reported in the following Table:

TABLE B

| % PVA | Density (g/cm$^3$) | Storage Capacity (g $CH_4$/l adsorbent) at 25° C. | | | |
|---|---|---|---|---|---|
| | | 2.4 MPa | 3.45 MPa | 5.17 MPa | 6.9 MPa |
| 2 | 0.56 | 87.8 | 103.4 | 123.8 | 140.0 |
| 3 | 0.58 | 76.8 | 90.6 | 107.5 | 120.4 |
| 4 | 0.66 | 80.0 | 93.8 | 110.8 | 125.4 |
| 5 | 0.61 | 79.3 | 92.8 | 108.4 | 120.5 |

With the exception of the results for the adsorbent having 2% by weight of polyvinyl alcohol, it can be seen that the storage capacities of the adsorbents with 3, 4 and 5% by weight of polyvinyl alcohol are approximately the same. Thus, the reduction in the specific adsorption of the adsorbents as the proportion of binder increases is compensated by an increase in density.

The results obtained with the adsorbent having only 2% by weight of polyvinyl alcohol are particularly interesting. The storage capacity of such an adsorbent at 3.45 MPa is 4.4 times greater than that obtainable by compression storage.

EXAMPLE 2

In order to prevent the disk-shaped adsorbents from swelling during the heat treatment at 300° C., they were held under confinement in a cylinder having the same diameter as the disk-shaped tablets. The storage capacity of the adsorbent thus treated was determined and the results obtained with the adsorbent having 2% by weight of polyvinyl alcohol are reported in the following Table:

TABLE C

| Density (g/cm$^3$) | Storage Capacity (g $CH_4$/l adsorbent) at 25° C. | | | |
|---|---|---|---|---|
| | 2.4 MPa | 3.45 MPa | 5.17 MPa | 6.9 MPa |
| 0.56[a] | 87.8 | 103.4 | 123.8 | 140.0 |
| 0.70[b] | 105.5 | 123.3 | 145.5 | 162.3 |

[a] without confinement
[b] with confinement

As can be seen from the above, in the case of the adsorbent heated at 300° C. under confinement, there is a substantial increase in density and thus a corresponding increase in storage capacity, as compared with the adsorbent which has been heat treated without confinement. Such an adsorbent can therefore store at 3.45 MPa 5.2 times more gas in a cylinder filled with the adsorbent, than in the same cylinder with no adsorbent. This storage capacity by adsorption is equivalent to that obtained by compression storage at 15.5 MPa.

As compared with the starting material used, i.e., the activated carbon AX-21 in powder form, which has a density of 0.30 g/cm3 and a storage capacity of 72.6 grams CH4 per liter of AX-21 at 3.45 MPa, the density of the adsorbent in compacted form with only 2% PVA and heat treated at 300° C. under confinement has increased more than twice and its storage capacity for methane at 3.45 MPa has increased by a factor of about 70%.

EXAMPLE 3 (Comparative Example)

In order to illustrate the effect that compaction has on the density, specific adsorption and storage capacity values, the density, specific adsorption and storage capacity of the adsorbent produced in accordance with Example 2 were determined before and after compaction. The density, specific adsorption and storage capacity of the starting material used, i.e., the activated carbon AX-21 in powder form, prior to impregnation with the polyvinyl alcohol, were also determined. The results are reported in the following Table:

TABLE D

| Adsorbent | Density g/cm$^3$ | Specific Adsorption (g $CH_4$/100 g adsorbent) (at 3.45 MPa and 25° C.) | Storage Capacity (g $CH_4$/l adsorbent) |
|---|---|---|---|
| AX-21 | 0.30 | 17.3 | 72.6 |
| Before compaction (impregnated[c]) | 0.34 | 14.8 | 72.0 |
| After compaction (impregnated[c]) | 0.70 | 14.8 | 123.3 |

[c] Impregnated with 2% PVA.

As compared with the activated carbon AX-21 the density of the adsorbent after compaction has thus increased by a factor ob 133% and its storage capacity for methane at 3.45 MPa has increased by a factor of 70%. As compared with the same carbon particles impregnated with 2% PVA but in uncompacted form, the density of the adsorbent in compacted form has increased by factor ob 106% and its storage capacity has increased by a factor of 71%.

EXAMPLE 4

The procedure of Example 1 was repeated, with the exception that the binder used was methylcellulose instead of polyvinyl alcohol and the compacted particles were heated to about 150° C., instead of 220° C. The amount of methylcellulose used during processing was 10% by weight.

The resulting adsorbent had a density of 0.55 g/m3. Its specific adsorption and storage capacity for methane at 25° C. and various pressures were also determined. The results are reported in the following Table:

TABLE E

|  | Pressure (MPa) | | | |
| --- | --- | --- | --- | --- |
|  | 2.4 | 3.45 | 5.17 | 6.90 |
| Specific Adsorption (g CH$_4$/100 g adsorbent) | 13.54 | 15.52 | 17.34 | 18.16 |
| Storage Capacity (g CH$_4$/1 adsorbent) | 86.9 | 103.4 | 123.2 | 138.1 |

As can be seen from the above, the density of the adsorbent in compacted form has increased by a factor of 83% and its storage capacity for methane at 3.45 MPa has increased by a factor of 42%, as compared with the starting used, i.e., the activated carbon AX-21 in powder form

We claim:

1. A method of producing a dimensionally stable, high-density adsorbent, comprising the steps of:
   a) mixing high surface area carbon particles with a solution of a binder in a solvent to form a slurry and thereby wet each particle of carbon with the solution of binder, said binder being selected from the group consisting of methylcellulose and a polyvinyl alcohol;
   b) removing the solvent from the slurry prepared in step (a) to obtain particles of carbon coated with a film of the binder; and
   c) compacting the binder-coated particles of carbon under pressure of about 140 to about 600 MPA to provide a compacted mass of high surface area carbon particles bound together and defining a network of substantially to cause a reduction of about 50 to about 200% in bulk volume of the mass and a corresponding increase of about 50 to about 200% in density, thereby obtaining an adsorbent capable of withstanding powdering when subjected to vibration and exhibiting a gas storage capacity increase of about 20 to about 100% over that of the high surface area carbon particles in loose form.

2. A method as claimed in claim 1, wherein prior to mixing said carbon particles with said solution of binder, said carbon particles are dispersed in said solvent to wet same and thereby fill pores in the particles with said solvent.

3. A method as claimed in claim 1, wherein removal of the solvent from the slurry is effected by heating said slurry under agitation to cause evaporation of said solvent.

4. A method as claimed in claim 1, wherein said binder is used in an amount of about 1 to about 10% by weight, based on the total weight of the adsorbent composition.

5. A method as claimed in claim 1, wherein said binder is methylcellulose.

6. A method as claimed in claim 5, wherein said methylcellulose has a viscosity of about 4,000 centipoises, calculated as a 2% solution in water.

7. A method as claimed in claim 1, wherein said binder is a polyvinyl alcohol.

8. A method as claimed in claim 7, wherein in step (c) the compacted particles are heated at a temperature and over a period of time such as to cause uniform melting of said polyvinyl alcohol throughout the compacted mass, while maintaining the compaction pressure.

9. A method as claimed in claim 8, wherein the compacted particles are heated at or slightly above the melting temperature of said polyvinyl alcohol.

10. A method as claimed in claim 8, wherein the compacted particles are heated to said temperature at a heating rate such as to avoid temperature gradients in the compacted mass and thereby prevent surface cracking.

11. A method as claimed in claim 9, wherein said polyvinyl alcohol has a molecular weight of about 125,000 and a melting point of about 200° C.

12. A method as claimed in claim 11, wherein the polyvinyl alcohol coated carbon particles are heated at a temperature of about 220° C., while being maintained under pressure.

13. A method as claimed in claim 7, wherein said polyvinyl alcohol is used in an amount of about 1 to about 5% by weight, based on the total weight of the adsorbent composition.

14. A method as claimed in claim 13, wherein said polyvinyl alcohol is used in an amount of about 2% by weight.

15. A method as claimed in claim 7, wherein the adsorbent thus obtained is subjected to a heat treatment at a temperature above the melting point of the polyvinyl alcohol to cause partial pyrolysis of said alcohol and evaporation of any solvent retained by said adsorbent.

16. A method as claimed in claim 15, wherein said heat treatment is carried out while holding the adsorbent under confinement to prevent swelling thereof.

17. A method as claimed in claim 15, wherein said polyvinyl alcohol has a melting point of about 200° C. and wherein said heat treatment is carried out at a temperature of about 300° C.

18. A method of producing a dimensionally stable, high-density adsorbent, comprising the steps of:
   a) a mixing high surface area carbon particles in the form of a powder with a solution of a binder comprising a polyvinyl alcohol in a solvent to form a slurry and thereby wet each particle of carbon with the solution of binder;
   b) removing the solvent from the slurry prepared in step (a) to obtain particles of carbon coated with a film of the binder; and
   c) forming the binder coated particles of carbon into a shaped product by compacting the particles under a pressure of from about 140 MPa to about 600 MPa to cause binding of the carbon particles together without substantial obstruction of micropores defined in the particles, thereby obtaining an adsorbent capable of withstanding powdering when subjected to vibration and having a density substantially greater than that of the high surface area carbon in particulate form.

19. A dimensionally stable, high-density adsorbent comprising a compacted mass of high surface area carbon particles bound together with a binder and defining a network of substantially unobstructed micropores prepared according to the process of claim 1.

20. A high-density adsorbent as claimed in claim 19, wherein said binder is methylcellulose having a viscosity of about 4,000 centipoises, calculated as a 2% solution in water.

21. A high-density adsorbent as claimed in claim 20, wherein said methylcellulose is present in a proportion of about 10% by weight, based on the total weight of the adsorbent composition.

22. A high-density adsorbent as claimed in claim 19, wherein said binder is a polyvinyl alcohol having a molecular weight of about 125,000 and a melting point of about pb 200° C.

23. A high-density adsorbent as claimed in claim 22, wherein said polyvinyl alcohol is present in a proportion of about 1 to about 5% by weight, based on the total weight of the adsorbent composition.

* * * * *

UNITED STATES PATENT AND TRADEMARK OFFICE
CERTIFICATE OF CORRECTION

PATENT NO. : 4,999,330

DATED : March 12, 1991

INVENTOR(S) : Tapan K. Bose et al

It is certified that error appears in the above-identified patent and that said Letters Patent is hereby corrected as shown below:

Column 1, line 9, after "producing" insert --same. More particularly, the invention is directed to--.

Column 7, line 11, delete "$g/m^3$" and insert --$g/cm^3$--.

Signed and Sealed this

Nineteenth Day of October, 1993

BRUCE LEHMAN

*Attest:*

*Attesting Officer*       Commissioner of Patents and Trademarks